June 12, 1945.  S. D. RUSSELL  2,378,107
PICK-UP
Filed April 19, 1941  4 Sheets-Sheet 1

INVENTOR
Stanley D Russell
BY
Emerson B Donnell
ATTORNEY

June 12, 1945.　　S. D. RUSSELL　　2,378,107
PICK-UP
Filed April 19, 1941　　4 Sheets-Sheet 2

INVENTOR
Stanley D Russell
BY
Emerson B Donnell
ATTORNEY

June 12, 1945.　　　S. D. RUSSELL　　　2,378,107
PICK-UP
Filed April 19, 1941　　　4 Sheets-Sheet 3
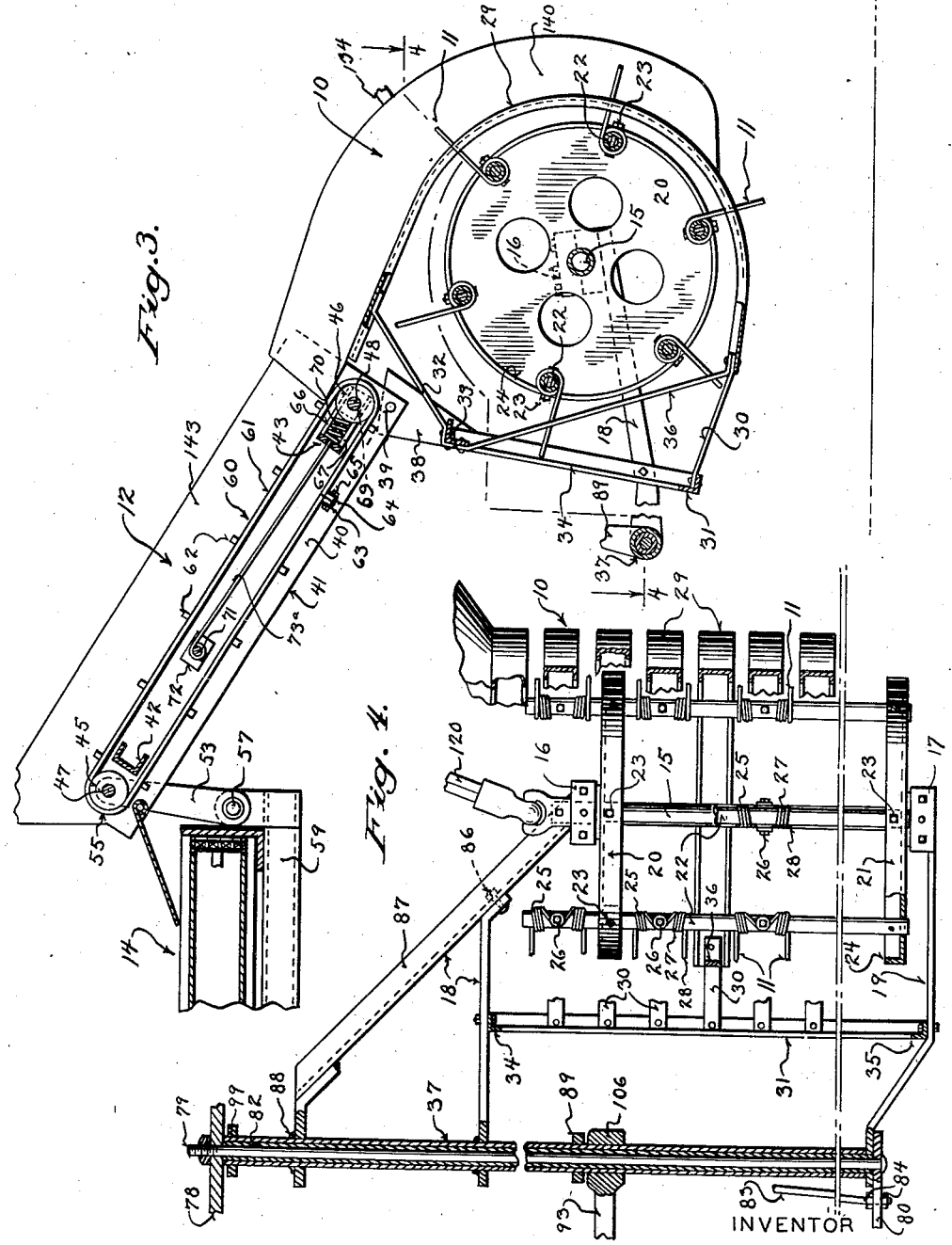
INVENTOR
Stanley D Russell
BY
Emerson B Donnell
ATTORNEY

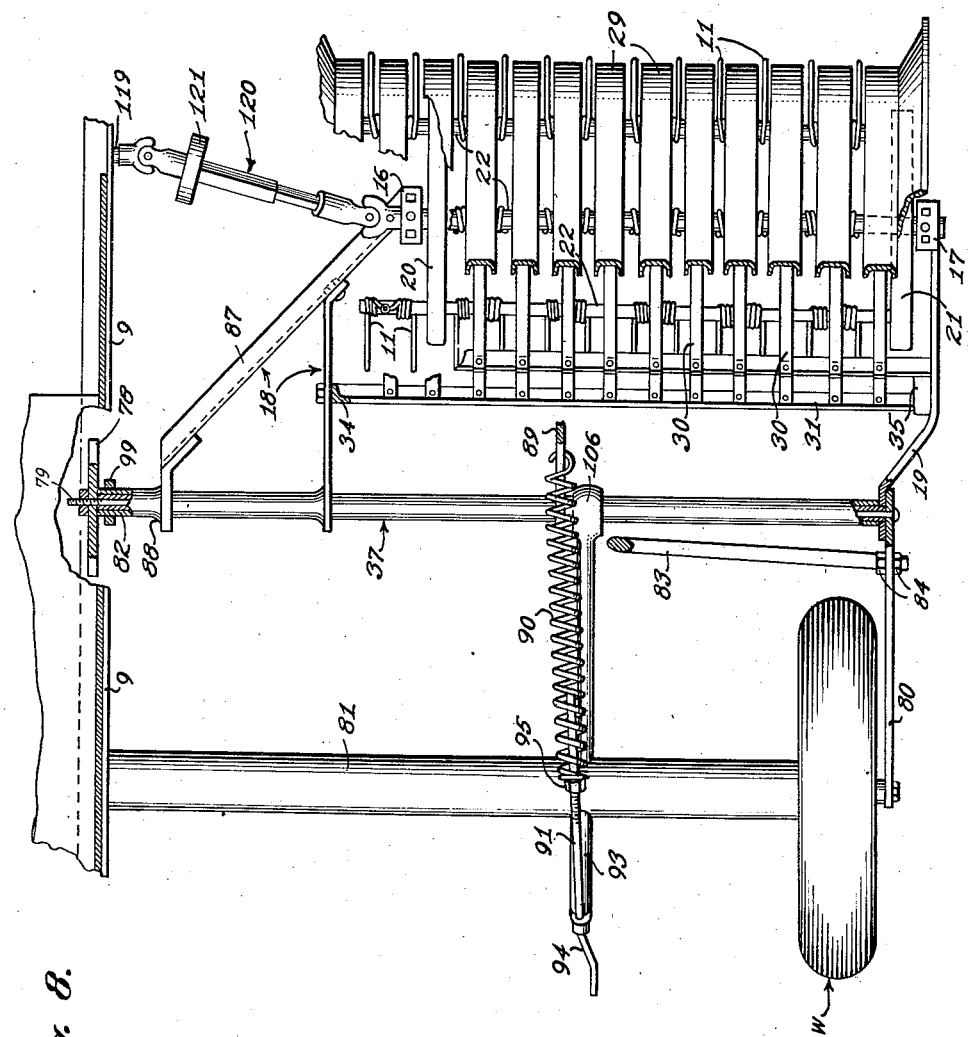

Patented June 12, 1945

2,378,107

UNITED STATES PATENT OFFICE 2,378,107

PICKUP

Stanley D. Russell, Racine, Wis., assignor to J. I. Case Company, Racine, Wis., a corporation Application April 19, 1941, Serial No. 389,395

13 Claims. (Cl. 56—364)

The present invention relates to baling machinery and more particularly to a pickup device for supplying such machinery with hay, straw, or other material to be baled directly from the windrow during passage of the baling machine over the field.

An object of the invention is to generally improve the construction and operation of pickups.

Further objects are to provide pickup mechanism of simple construction, consisting of few parts; such mechanism which is more reliable and less subject to damage than prior constructions.

A further object is to provide such a pickup which will require no carrying wheels, shoes or the like in contact with the ground.

Further objects are to provide a pickup which will gather the material in a cleaner manner than known constructions and which will handle the material more gently.

A further object is to provide such structure which may be raised for transportation and lowered for operation, but which is supported from the baler under all conditions.

A further object is to provide an improved apron conveyor and tension adjusting and release means therefor.

Further objects and advantages will become apparent from the annexed specification and accompanying drawings in which:

Fig. 3 is a view of a portion of Fig. 2 enlarged and with the parts in a different position.

Fig. 4 is a sectional view of the mechanism shown in Fig. 3 on the line 4—4 of Fig. 3, with parts broken away.

Fig. 5 is a sectional view taken approximately on the line 5—5 of Fig. 1 enlarged and with parts broken away.

Fig. 6 is a detail of certain mechanism indicated in Fig. 5.

Fig. 7 is an enlarged detail of certain mechanism indicated in Fig. 2.

Fig. 8 is a sectional view taken approximately on the line 8—8 of Fig. 2.

Similar reference characters have been applied to the same parts throughout the specification and drawings.

Figure 2:
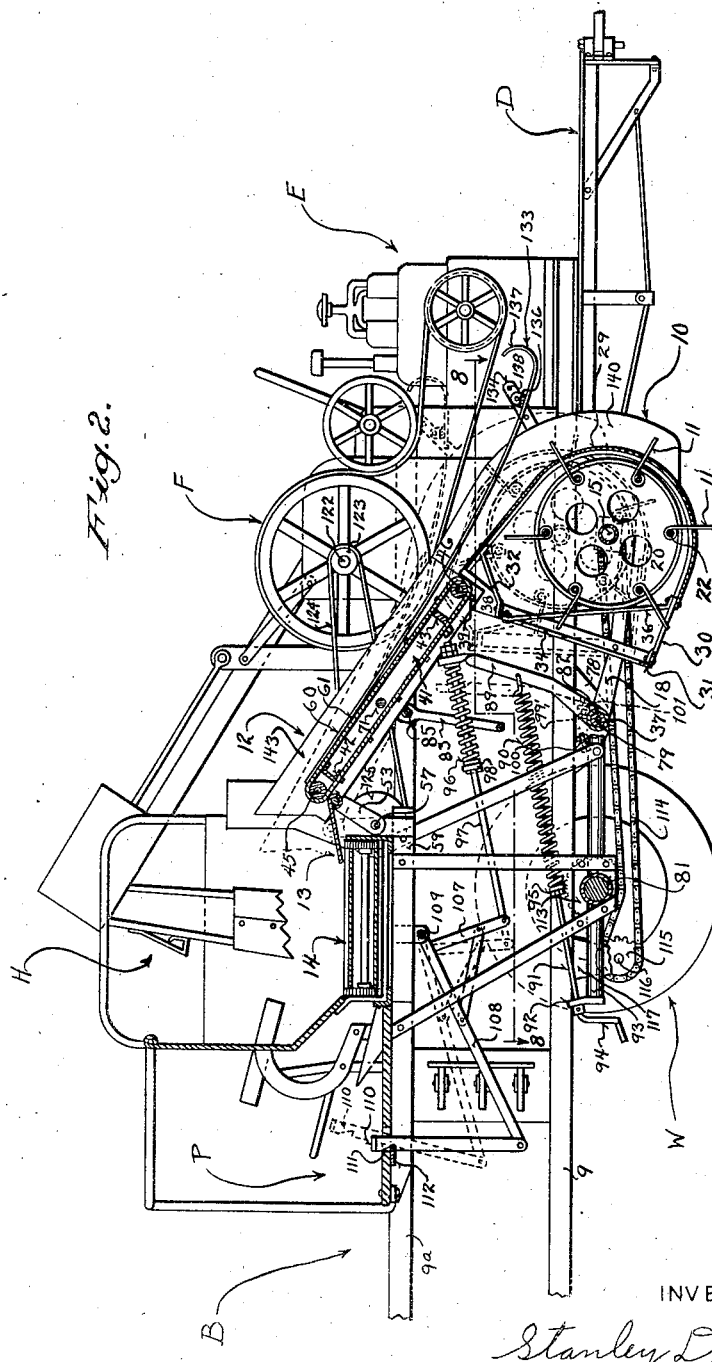
Fig. 2 is a right side elevation of a baling machine with the pickup mechanism attached, the latter in section on the line 2—2 of Fig. 1.

Referring first to Fig. 2, the machine illustrative of the invention includes a baler generally designated as B, supported on one or more ground wheels as W and having a draw bar portion D. The baler is driven as by an engine E actuating a fly wheel F and has a feeder head of suitable or well-known type H. A platform P is provided to accommodate an operator who supervises the feeding process and also drops the blocks in well-known manner, the details of such a baler per se being well-known, it is unnecessary to describe the baler further except to state that it has a sill or frame member 9 from which part of the pickup is supported, and a frame member 9a from which other parts are supported.

Material to be baled is picked up by a pickup unit, generally designated as 10, carried on the baler as will appear and which sweeps the ground as by fingers 11—11, but without resting thereon. Picked up material is raised to an apron conveyor generally designated as 12 which elevates it to a plate 13 over which it slides onto a cross conveyor generally designated as 14 and which may be of suitable or well-known type leading toward feeder head H in well-known manner. Accordingly, during progress of the baler across the field, material is picked up from the field and automatically delivered to feeder head H and accordingly to the baler.

Referring particularly to Figs. 3 and 4, pickup 10 includes a cylinder or cylinder-like member mounted on a shaft 15 which may be hollow if desired to reduce weight, and journaled in bearings 16 and 17 carried on braces 18 and 19, supported from the baler as will appear. Shaft 15 carries a plurality of heads as 20 and 21 or other spacer members of suitable type, having engaged therewith a plurality of elements 22—22 in the present instance composed of tubes or pipes fixed as by bolts 23—23 with flanged portions as 24 of heads 20 and 21. The result is a cage-like cylindrical structure which is readily rotatable in bearings 16 and 17, elements 22 each carrying a plurality of above mentioned teeth 11. Teeth 11 may be of any suitable or preferred type, in the present instance being constituted in pairs, a length of suitable spring wire being coiled as at 25 about one of elements 22, and curved under the head of a bolt 26 or the like traversing the element. The wire is also coiled as at 27 and then projects as at 28 to form the other finger. A plurality of pairs of fingers 11 is arranged on each of elements 22 and in the present instance so that fingers on any element 22 lie in the same plane normal to shaft 15 as do fingers on others of elements 22. In the present instance, fingers 11 extend from elements 22 substantially radially of the cylinder, although other dispositions of the fingers are contemplated if desired. Supported about the cylinder is a plurality of strippers 29—29, in the present instance comprising channel section strips with their flanges turned in toward shaft 15. Strips 29 are anchored to a series of strips 30, fixed with a cross brace or angle iron 31 constituting part of a pickup frame as will appear. Strip 29 extends forwardly beneath the cylinder and then curves upwardly in front of the cylinder and rearwardly over the cylinder and is anchored to a strip 32 extended to an angle iron 33 or other bracing member also constituting part of the aforesaid pickup frame. Members 31 and 33 are united by upright members as 34 and 35 fixed respectively in any suitable manner with braces 18 and 19, thus defining a rectangular frame from which a series of strips 29 may be supported.

A brace 36 extends from member 33 to a suitable point such as the junction between each of strips 29 and each of strips 30. Each of strips 29 thus is secured in position sufficiently rigidly for its purpose. As suggested in Figs. 1 and 4, strips 29 define a drum-like stationary unit, the spaces between the strips constituting slots through which fingers 11 extend.

Strips 29 in their course about elements 22 gradually recede from a point beneath the cylinder until, at a point substantially above the cylinder they are spaced therefrom substantially to the extent of the length of teeth 11. In effect, therefore, teeth 11 upon counterclockwise rotation of shaft 15, as seen in Fig. 3, will project a maximum distance at or near the bottom of the pickup and will gradually withdraw within the drum defined by strips 29 until they disappear substantially directly above the drum. The teeth, therefore, sweep the ground and pick up loose hay or straw-like material propelling it upwardly and over the top of the cylinder and backwardly as seen in Fig. 3 until the teeth withdraw inside of the drum defined by strips 29. At this point following material continues to propel the material just picked up onto apron conveyor 12.

Braces 18 and 19, in the present instance, are fixed with a tubular or other suitable fulcrum member 37 supported for rotation in a fixed position relatively to baler B as will appear. Rotation of fulcrum member 37 will accordingly cause raising or lowering of shaft 15, frame members 31, 33, etc., and accordingly of the entire pickup 10.

Frame member 34 carries a plate or support 38 pivotally connected as by a pin or the like 39 with a side member 40 constituting part of a frame generally designated as 41 of apron conveyor 12. Frame 41 may comprise above mentioned side member 40, cross members 42 and 43 and a side member 44, Fig. 1. Any other suitable construction may be used, if desired, the frame serving to space rollers 45 and 46, in the present instance fixed with shafts 47 and 48 respectively, journaled in bearings as 49 and 50. Member 44, as more particularly seen in Fig. 5, is pivoted as by a pin 51 to a plate 52 fixed with above mentioned upright member 34 and therefore constituting a part of the pickup frame. Apron conveyor 12 is therefore pivoted to the pickup frame and remains in receiving relation thereto during raising and lowering movements thereof. This movement results in substantial fore and aft movement of the upper end of conveyor 12. Conveyor 12, therefore, is supported on links 53 and 54 (Figs. 3 and 5) pivoted as at 55 and 56 to side members 40 and 44 respectively and at 57 and 58 to frame members 59 and 59a constituting part of the above mentioned cross conveyor 14. In this manner conveyor 12 is supported to be free to move forward and back as necessary.

Apron conveyor 12, as above noted, includes rollers 45 and 46 about which is disposed an apron conveyor 60, in the present instance comprising a belt portion 61 having a series of cleats or ribs as 62—62. The ends of belt 61 may be united in any suitable or well-known manner, but in the present instance a special cleat 63 fixed with one end of belt 61 abuts a mating cleat 64 fixed with the other end of belt 61, the two being united by means of a series of fastenings, bolts, or the like 65. Belt 61 in the present instance is driven from upper roller 45. Bearing 50 is slidable in guides as 66 and 67 and a spring 68 is compressed between bearing 50 and above mentioned cross member 43. A similar bearing 69, Fig. 1, supports the opposite end of shaft 48. The expansion of spring 68 and a similar spring 70 urge bearings 50 and 69 downwardly and accordingly tension belt 61.

Expedients are provided for removing the tension from belt 61, for well-known purposes. In the present instance a shaft 71 is suitably rotatably supported in bearings as 72 in side members 40 and 44 and has a plurality of cables or other flexible elements 73 and 73a (Fig. 3) wound thereon as indicated in Fig. 5. Cables 73 and 73a pass through suitable openings in cross member 43 and are fixed respectively with bearings 50 and 69. Rotation of shaft 71 accordingly tightens the cables and slides bearings 50 and 69 upwardly against the pressure of springs 68 and 70. This moves roller 46 so as to loosen belt 61. In the present instance, rotation of shaft 71 may be effected by a hand wheel 74, although other manually operated means is contemplated, and shaft 71 may be maintained in position as by a ratchet 75, Fig. 6, fixed with shaft 71 and engaged by a pawl 76 pivoted as at 77 to side member 44. Tension may be restored to belt 61 by releasing ratchet 75 from pawl 76 in well-known manner.

Returning to Figs. 2, 3 and 4, fulcrum 37 may be supported from baler B in any suitable or well-known manner, for example, a bracket 78, Figs. 2 and 7, is carried by sill 9 of baler B and has for example a long bolt 79 extending outwardly therefrom. The outer end of bolt 79 is carried in a strut or push bar 80 (see also Figs. 1 and 8) extending forwardly from an axle 81 carried by ground wheels W and constituting part of baler B. Bracket 78 and strut 80 are spaced apart as by a sleeve 82 surrounding bolt 79 and on which is journaled above mentioned fulcrum member 37. Push bar 80 also has engaged therewith a stay 83, adjustable as by nuts 84—84, stay 83 as seen in Fig. 2 being fixed with frame member 9a of baler B as by a bolt or the like 85. Axle 81 being fixed with baler B in any suitable manner, the above described structure results in a substantially rigid outrigger which can readily carry pickup 10. Fulcrum 37 has fixed thereon above mentioned brace 19 and also brace 18, brace 18 being bolted or otherwise fixed at 86 with a diagonal brace 87 constituting part of brace 18 and extending rearwardly and inwardly and fixed with fulcrum 37 in any suitable manner as by welding at 88. Oscillation of fulcrum 37 will accordingly raise and lower pickup 10 as will be apparent. A lever arm 89 is also fixed with fulcrum 37 and extends generally upwardly.

A tension spring 90, Fig. 2, extends in the present instance backwardly from lever arm 89 to an adjusting screw 91 journaled in a bracket 92, carried for example by a strut 93, in the present instance extending backwardly from axle 81, screw 91 having a crank or other manually operable member 94. Rotation of crank 94 turns screw 91 and causes movement of a nut 95 fixed with spring 90. Accordingly the tension of spring 90 may be readily adjusted and in the present illustrative embodiment it is made sufficient to overcome the weight of pickup 10 and conveyor 12 or at least that part of it which is carried on fulcrum 37. Thus pickup 10 tends to rise from the ground to the upper position indicated in Fig. 3 and in dotted lines in Fig. 2. Pickup 10 might be lowered by reducing the tension in spring 90, or as in the present instance by overcoming spring 90. This is done by means of a compression spring 96, in the present instance traversed by a rod 97 which is guided in a suitable aperture in above mentioned lever 89. Rod 97 may be moved longitudinally, as will appear, to compress spring 96 between lever 89 and an abutment 98 fixed on rod 97, in which case the combined pressure of spring 96 and weight of pickup 10 and conveyor 12 will overcome spring 90 and cause pickup 10 to drop to its lowermost position. Pickup 10 is therefore held down by the resilient pressure of spring 96 and may readily rise to clear an obstruction or, if necessary, because of uneven ground.

As seen in Fig. 7, fulcrum 37 has a tongue member 99 projecting upwardly in the present instance adjacent bracket 78 and which may limit any oscillatory movement of fulcrum 37 by engagement with stop screws 100 and 101, respectively, to determine upward and downward positions of pickup 10. Screws 100 and 101 may be carried in brackets 102 and 103, in the present instance, for convenience, fixed with bracket 78, lock nuts 104 and 105 being provided, if desired, to maintain the adjustment. Screws 100 and 101 may be readily positioned to locate pickup 10 in either its upper or lower position.

To brace fulcrum 37 against the substantial pull of spring 90, above mentioned strut 93 (Fig. 4) may also extend forwardly of axle 81 and may have a bearing portion 106, engaging fulcrum 37.

Any suitable means may be employed for actuating rod 97, in the present instance a bell crank (Fig. 2) having levers 107 and 108 being fulcrumed at 109 on baler B and having a pedal 110 pivoted to lever 108 and extending upwardly through platform P. Pedal 110 may have suitable means for maintaining it in lowermost position, for example a notch 111 engageable with a latch plate 112 fixed with platform P. Pedal 110 will be held in its upper position, as shown in dotted lines, by rearward movement of rod 97 under the influence of springs 96 and 90 under which condition spring 90 will overcome the weight of pickup P and cause lever arm 89 to move backwardly. However, if pedal 110 is pushed down to the full line position, and notch 111 is interlocked with plate 112, rod 97 is pushed forwardly and spring 96 is compressed, through bell crank levers 108 and 107. The operator riding on platform P accordingly has immediate control of the position of pickup 10 and may raise it, if necessary, to avoid obstructions, etc. However, pickup 10 is also free to rise of its own accord against the resilient pressure of spring 96 if an obstruction is encountered. The drives for these various units are as follows.

Ground wheel W carries a sprocket 113 engaging the upper run of a chain 114 supported for example on an idler 115 journaled on a pin 116 supported for example on a bracket 117, and adjustable thereon, if desired, in any suitable manner. Chain 114 also passes about a sprocket or the like 118, Fig. 1, fixed in the present instance on a shaft 119 journaled in any suitable manner on baler B and connecting as by an extensible tumbler shaft 120 with above mentioned shaft 15, a ratchet drive 121 of suitable or well-known type, being preferably interposed, if desired to prevent reverse rotation of pickup elements 22—22 in the event baler B is backed up. A ground drive is accordingly obtained for pickup 10, which is desirable in that its speed is substantially proportional to the rate of progress of the baler.

Figure 1:
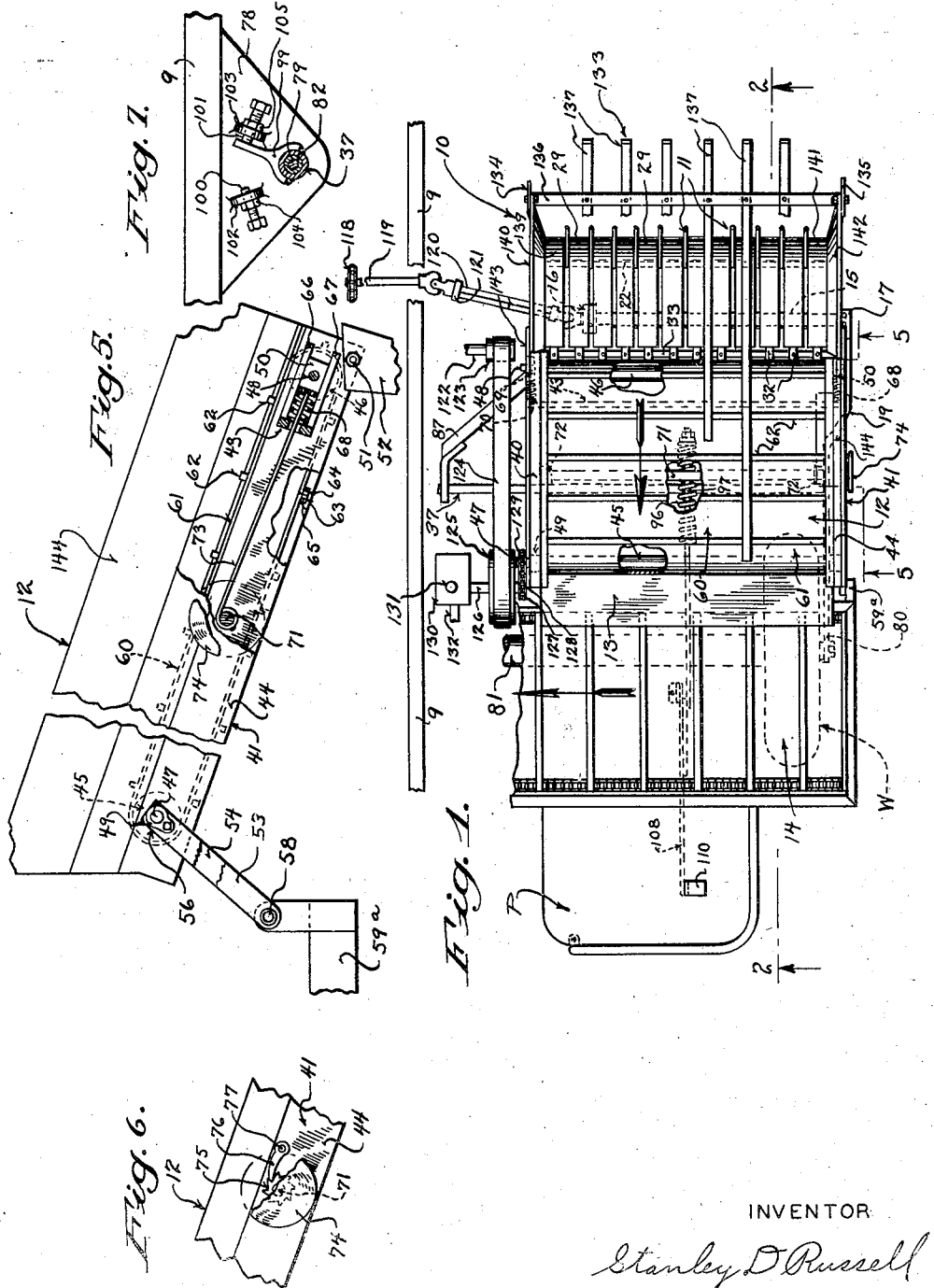
Figure 1 is a plan view of a pickup device according to the invention.

Conveyor 12, however, is driven by power, in the present instance a shaft 122, being the main shaft on which fly wheel F is carried, carries also a pulley 123 as seen particularly in Fig. 1. Pulley 123 drives, through a belt or the like 124, a pulley 125 mounted on a shaft 126 in the present instance concentric with above mentioned pivot 58. Shaft 126 carries a sprocket or the like 127 driving, as through a chain 128, a sprocket 129 fixed in the present instance on above mentioned shaft 47 forming the axis of above mentioned roller 45. Rotation of shaft 122 accordingly drives roller 45 and causes the desired motion of belt 61. Since shaft 126 is concentric with pivot 58, motion of link 54 does not disturb the driving relation between sprockets 127 and 129 while shaft 126 may remain on a fixed center relatively to shaft 122. In the present instance, shaft 126 extends into a gear box 130 of suitable or well-known type having a filler cap 131 and a driven shaft 132 which may be connected in any suitable or well-known manner to drive above mentioned cross conveyor 14. Cross conveyor 14 being of well known type, it is not necessary to describe it further.

At times in picking up a windrow, because of interference by the wind or for other reasons, it is necessary to hold the picked up material in contact with pickup 10 and conveyor 12. For this purpose, a hold-down unit generally designated as 133 is provided. On forwardly extending brackets 134 and 135, Fig. 1, a strip 136 is pivotally supported and has longitudinally extending strips or bars 137—137. Strips 137 may have upwardly turned ends at their front portions, forwardly of pickup 10, and extend rearwardly and upwardly substantially parallel to each other and in position to rest lightly on apron 60 or on material traveling thereon. The weight of strips 137 is sufficient to prevent blowing of the picked up material before it can be delivered to cross conveyor 14, and the strips also provide a "bite" between themselves and pickup 10 so as to insure continuous upward movement of a windrow over pickup 10 and avoid any tendency for the pickup to push material ahead of it. Strip 136 may be supported in one or more holes as 138, Fig. 2, so as to be adjustable to vary the distance between the pickup and hold-down member 133.

Strippers 29 are distributed substantially evenly between teeth 11 but at one end of the series of teeth, a stripper 139 is provided, Fig. 1, defining an edge of pickup 10 and having fixed therewith a flare sheet 140 constituting roughly a section of a cone and defining a channel over pickup 10 and onto conveyor 12. A similar stripper 141 at the opposite end of pickup 10 has a flare sheet 142 for a similar purpose. Flare sheets 140 and 142 may register with outer guards or sides 143 and 144 defining a continuation of the channel over pickup 10. Flare sheets 140 and 142 together with sides 143 and 144 cooperate effectively with hold-down 133 to prevent material being inadvertently removed from the pickup.

The above is a complete description of an illustrative embodiment of the invention, but it is to be understood that other details of construction within the knowledge of one skilled in the art are contemplated as equivalent and that the invention is not to be taken as limited by anything in this specification or in fact in any manner except as defined by the prior art and the annexed claims. What is claimed as new and desired to be secured by Letters Patent of the United States is:

1. In a pick-up for a baler having baling mechamism, a cylinder rotatable on an axis transverse to the direction of travel of the baler, a plurality of pick-up teeth projecting from the periphery of said cylinder and yieldable thereon, said teeth being supported in fixed relation to the cylinder, a plurality of strippers disposed between the teeth and generally following the path of travel thereof but receding from the cylinder in the region where it is desired to have the picked up material leave the cylinder, a hold down element positioned outside of said strippers to engage material being picked up and maintain it in contact with said strippers and teeth, a roller disposed in the region where the picked up material leaves said teeth, an apron conveyor carried on the roller and positioned to receive material stripped by the strippers and to convey said material toward said baling mechanism.

2. In a pick-up for a baler having baling mechanism, a cylinder rotatable on an axis transverse to the direction of travel of the baler, a plurality of pick-up teeth projecting from the periphery of said cylinder and yieldable thereon, said teeth being supported in fixed relation to the cylinder, a plurality of strippers disposed between the teeth and generally following the path of travel thereof but receding from the cylinder in the region where it is desired to have the picked up material leave the cylinder, a roller disposed in the region where the picked up material leaves said teeth, an apron conveyor carried on the roller and positioned to receive material stripped by the strippers and to convey said material toward said baling mechanism.

3. In a pick-up for a baler having baling mechanism, a cylinder rotatable on an axis transverse to the direction of travel of the baler, a plurality of pick-up teeth projecting from the periphery of said cylinder and yieldable thereon, a plurality of strippers disposed between the teeth and generally following the path of travel thereof but receding from the cylinder in the region where it is desired to have the picked up material leave the cylinder, a hold down element positioned outside of said strippers to engage material being picked up and maintain it in contact with said strippers and teeth, a roller disposed in the region where the picked up material leaves said teeth, an apron conveyor carried on the roller and positioned to receive material stripped by the strippers and to convey said material toward said baling mechanism.

4. In a pick-up for a baler, having baling mechanism, a cylinder rotatable on an axis transverse to the direction of travel of the baler, a plurality of pick-up teeth projecting from the periphery of said cylinder, said teeth being supported in fixed relation to the cylinder, a plurality of strippers disposed between the teeth and generally following the path of travel thereof but receding from the cylinder in the region where it is desired to have the picked up material leave the cylinder, a hold down element positioned outside of said strippers to engage material being picked up and maintain it in contact with said strippers and teeth, a roller disposed in the region where the picked up material leaves said teeth, an apron conveyor carried on the roller and positioned to receive material stripped by the strippers and to convey said material toward said baling mechanism.

5. In a pick-up for a baler having baling mechanism, a cylinder rotatable on an axis transverse to the direction of travel of the baler, a plurality of pick-up teeth projecting from the periphery of said cylinder and yieldable thereon, a plurality of strippers disposed between the teeth and generally following the path of travel thereof, but receding from the cylinder in the region where it is desired to have the picked up material leave the cylinder, a roller disposed in the region where the picked up material leaves said teeth, an apron conveyor carried on the roller and positioned to receive material stripped by the strippers and to convey said material toward said baling mechanism.

6. In a pick-up for a baler having baling mechanism, a cylinder rotatable on an axis transverse to the direction of travel of the baler, a plurality of pick-up teeth projecting from the periphery of said cylinder, and normally supported in fixed relation thereto, a plurality of strippers disposed between said teeth and generally following the path of travel thereof, but receding from the cylinder in the region where it is desired to have the picked up material leave the cylinder, a roller disposed in the region where the picked up material leaves said teeth, an apron conveyor carried on the roller and positioned to receive material stripped by the strippers and to convey said material toward said baling mechanism.

7. In a pick-up for a baler, having baling mechanism, a cylinder rotatable on an axis transverse to the direction of travel of the baler, a plurality of pick-up teeth projecting from the periphery of said cylinder, a plurality of strippers disposed between the teeth and generally following the path of travel thereof, but receding from the cylinder in the region where it is desired to have the picked up material leave the cylinder, a hold down element positioned outside of said strippers to engage material being picked up and maintain it in contact with said strippers and teeth, a roller disposed in the region where the picked up material leaves said teeth, an apron conveyor carried on the roller and positioned to receive material stripped by the strippers and to convey said material toward said baling mechanism.

8. In a pick-up for a baler, having baling mechanism, a cylinder rotatable on an axis transverse to the direction of travel of the baler, a plurality of pick-up teeth projecting from the periphery of said cylinder, a plurality of strippers disposed between the teeth and generally following the path of travel thereof, but receding from the cylinder in the region where it is desired to have the picked up material leave the cylinder, a roller disposed in the region where the picked up material leaves said teeth, an apron conveyor carried on the roller and positioned to receive material stripper by the strippers and to convey said material toward said baling mechanism.

9. In a pick-up baler, a baling machine, means for supporting the baling machine for travel over the ground, a substantially rigid outrigger element extended at one side of the baler for supporting a pick-up device, an arm extending forwardly from said outrigger, a pick-up supported on said arm and means including opposed resilient elements for controlling the arm for floatingly supporting the pick-up the desired distance above the ground, one of said resilient elements being stressed to continuously maintain said pick-up in a raised position and a second of said resilient elements being stressable to overcome the first resilient element and cause said pick-up to be lowered, and means for so stressing said second resilient element.

10. In a pick-up baler, a baling machine, means for supporting the baling machine for travel over the ground, a substantially rigid outrigger element extended at one side of the baler and including a rockable pivot, a forwardly extending arm fixed with a pivot, a pick-up supported from the arm and means for controlling the rockable pivot for floatingly supporting the pick-up, including an arm extending upwardly from said pivot, a tension spring connected to the arm and stressed to exert a force thereon sufficient to raise the pick-up, and a compression spring engaged with said arm in opposition to said tension spring, and means for compressing said compression spring for overcoming said tension spring and causing said pick-up to descend to a lowered position.

11. In a pick-up baler, a baling machine, means for supporting the baling machine for travel over the ground, and a pick-up supported on the machine for vertical adjustment relatively thereto, means for controlling the adjustment of said pick-up including opposed springs, one of said springs being stressed to maintain said pick-up continuously in a raised position, and another of said springs being adapted when stressed to overcome the first spring and cause lowering of said pick-up, and a foot pedal for stressing one of said springs for causing adjustment of said pick-up.

12. In a pick-up baler, a baling machine, means for supporting the machine for travel over the ground, a pick-up supported from the machine for vertical adjustment relatively thereto, opposed spring means for controlling the vertical adjustment of said pick-up one of said spring means being stressed to maintain said pick-up continuously in a raised position, and other of said spring means being adapted when stressed to overcome the first spring means and cause lowering of said pick-up, and stop means for determining the up position of said pick-up when one spring is stressed and for determining the down position of said pick-up when both springs are stressed.

13. In a pick-up baler having a ground wheel and a fly wheel shaft, and including a pick-up cylinder and an apron conveyor hingedly connected to and extending from the cylinder and having a free end supported on the baler, means for driving said apron conveyor including a driving element on said fly wheel shaft, a driven element on said pick-up means, connections from said driven element to said apron conveyor, flexible driving means extending between said driving element and said driven element and a separate drive from said ground wheel to said pickup cylinder.

STANLEY D. RUSSELL.